United States Patent [19]

Schmidt

[11] 3,745,299
[45] July 10, 1973

[54] PROJECTION WELDING MEANS AND FITTING FOR USE THEREIN

[75] Inventor: Adolf Schmidt, Karlsruhe, Germany

[73] Assignee: Schmalbach-Lubeca-Weke Aktiengesellschaft, Braunschweig, Germany

[22] Filed: Sept. 3, 1971

[21] Appl. No.: 177,712

[30] Foreign Application Priority Data
Sept. 15, 1970 Germany .................. P 20 45 495.9

[52] U.S. Cl. ...................... 219/93, 219/117, 220/91
[51] Int. Cl. .......................................... B23k 11/10
[58] Field of Search ................. 219/93, 91, 92, 117, 219/118; 220/91

[56] References Cited
UNITED STATES PATENTS

| | | | |
|---|---|---|---|
| 3,454,188 | 7/1969 | Larsen | 220/91 |
| 3,476,289 | 11/1969 | McCoy | 219/93 X |
| 2,845,522 | 7/1958 | Hull | 219/93 |
| 3,476,905 | 11/1969 | Larsen | 219/93 |

*Primary Examiner*—J. V. Truhe
*Assistant Examiner*—B. A. Reynolds
*Attorney*—Charles J. Diller et al.

[57] ABSTRACT

This disclosure relates to a projecting welding process wherein one of the parts to be welded has a coating layer formed of an electrically nonconductive material and wherein the removal of this coating layer at the desired point of weld is automatically accomplished in the application of a second part to the first part. The second part is provided with one or more projections each of which is slightly deformable and which has a cutting edge which is shifted relative to the first part during pressure application of the second part relative to the first part in a normal welding process to effect a localized cutting away of the coating layer and thus provide for metal-to-metal contact.

5 Claims, 11 Drawing Figures

INVENTOR
ADOLF SCHMIDT
BY
ATTORNEYS

Patented July 10, 1973 3,745,299

INVENTOR.
ADOLF SCHMIDT
BY
Diller, Brown. Ramik & Holt
ATTORNEY.

PROJECTION WELDING MEANS AND FITTING FOR USE THEREIN

This invention generally relates to a projection welding process for the connection of metal parts, of which at least one has a surface coating of an electrically nonconductive raw material, for example organic lacquer, and especially to the attachment of fittings provided with at least one bulge-type projection, such as the eyes for bucket bails, made of sheet metal on containers with a protective coating of varnish.

BACKGROUND OF THE INVENTION

In the case of a projection welding process which serves preferably for the attachment of fittings, such as the above mentioned eyes for buckets to the bodies of metal buckets, hump-like projections are formed on the fitting element. After being formed with these hump-like projections, the pertinent fitting element then is pressed against the support, for example the body of the bucket. By introduction of a welding current, the fitting element will be welded at the points of contact, namely at the hump-like projections, with the body of the bucket.

In practice, when carrying out this projection welding process for the attachment of fitting elements to containers, difficulties arise because these containers customarily have protective coatings of varnish which consist of an electrically nonconductive, mostly organic raw material. When the fitting elements meet such containers or are pressed against them, then the hump-like projections will come into contact only with the varnished surfaces of the container. In order to be able to carry out a welding under such circumstances, the voltage of the welding current must be increased until the layer of varnish can be punctured. However, no constant reproducible value for the voltage of the welding current required in each individual case will result. The consequence of that is, that the sheet metal of the body of the container will break. Besides, remnants of varnish will remain in the place of welding, which uncontrollably impair the strength of the welding. A further disadvantage develops through the fact that the various coating varnishes used in practice react differently because of their specific chemical nature.

These disadvantages, which would make any practical application of projection welding for the attachment of fitting elements to containers questionable, could be avoided hitherto through the fact that in the area of the hump-like projections, zones free of varnish were created on the bodies of the containers by cutting out the varnish layer or by removing the varnish in a separate operating step. In this manner the metallic contact required for the perfect execution of the projection welding process between the hump-like projections of the fitting element and the body of the container developed. The creation of such zones free of varnish or of points free of varnish however is tied to a considerable expenditure in labor and cost.

SUMMARY OF INVENTION

The object of the present invention avoids this disadvantage and develops the initially mentioned process, as well as the fitting element which is to be attached according to said process, in such a way that the welding can be carried out without any cut outs in the surface covered with protective varnish as well as without the disadvantages caused hitherto by the protective varnish.

The initially mentioned projection welding process according to the invention for the achievement of this object is characterized by the fact that hump-like projections are produced with a cutting or punching edge running through the area of their peaks, and in that this cutting or punching edge, when the fitting element is pressed into place, is moved because of a deformation in a cutting way across the surface of the protective varnish and after a locally limited removal of varnish is brought into metallic contact with the container.

According to the invention a fitting element of the previously mentioned object is brought about by the fact that the hump-like projection in the vicinity of its peak is limited by its cutting or punching edge which defines a cutting plane slanted at an acute angle in relation to the plumb line toward the surface of the container.

The invention makes use of the fact that punching or cutting edges on metal parts always are sharp edged. Furthermore, the fact that fitting elements made of sheet metal will be deformed to a certain extent by the action of the surface pressure is utilized. These deformations have a consequence that the sharp punching or cutting edges, which pass through the hump-like projections in the vicinity of the peak, carry out relative movements in regard to the body of the container, which, despite their slight extent, result in the fact that the cutting or punching edges puncture the layer of protective varnish and advance to the metallic base. Thus, a perfect metallic contact between the hump-like projection of the fitting element and the body of the bucket or container, which is required for a perfect execution of the projection welding, is established. The projection welding, after this contact has been assured, can be carried out both economically and advantageously.

It has been found that the contact surface between a hump-like projection, equipped according to the invention with a cutting or punching edge in the vicinity of the peaks, and the support or the body of the container or bucket is smaller than occurred heretofore. Therefore, considerably less welding current is needed than in the case of the hump-like projections customary hitherto and as a consequence of that only a locally, very narrowly limited heating will take place. The so-called heat points, which are unavoidable in the case of projection welding and which show up on the reverse side of the sheet metal of the container or bucket, are considerably smaller than they had been hitherto in the case of the use of the process according to the invention or in the case of use of fitting elements developed according to the invention. Therefore, an improvement in quality will be achieved. Besides, the lower welding current will lead to savings in energy, which improve the profitability of the projection welding process developed according to the invention as compared to the known process. At the same time, this reduction of the welding current will in no way lead to an impairment of the strength of the welded connections, because the metallic contact between the fitting element and the body of the container or bucket produced according to the invention cannot be impaired by any kind of films of oxide or other influences.

The hump-like projections customary hitherto behave rigidly and stiffly. The hump-like projections produced according to the invention with their cutting or punching edges running through the area of their peaks on the other hand have a certain flexibility and elastic property, whereby however their stability is sufficient for the reception of the pressure during tightening. The flexibility represents a further essential characteristic of the invention; for it makes is possible to considerably enlarge the limits of tolerance. Certain differences in height of the hump-like projections will be compensated by such a resiliency, so that all hump-like projections of the fitting element will assuredly be brought in contact with the body of the container or bucket. It was possible to achieve this object only in the case of prior fitting elements by maintaining very narrow tolerances of measurement. However, it was also necessary to make just as high requirements for the support, to wit, the structure of the surface of the body of the container or bucket; for unevennesses of the surface of this body of the container or bucket could have as a consequence hitherto that individual hump-like projections did not some into contact with the support. Also inaccuracies of wear of the welding electrodes constitute a criterion, as a result of which the even contact of all hump-like projections could be put in jeopardy hitherto.

An advantageous further development of the process developed according to the invention provides that the projections are formed on limiting edges of the fitting element. This measure assures above all the simple production of the hump-like projections with their cutting or punching edges running through the area of their peaks, and, in addition, it leads to the fact that the outside edges of the fitting elements will fit particularly solidly on the support and will not rock undesirably.

It will be effective if the projections are disposed symmetrically to a reference point or to a reference axis on the fitting element.

For the purpose of achieving hump-like projections with cutting or punching edges running through the area of their peaks, the fitting element can be developed in several different shapes. If the projections are placed at the edge of the fitting element, then this will result in the advantage, already indicated for the process, that the limiting edge will constitute at the same time the cutting or punching edge of the hump-like projections.

But it also is possible to form hump-like projections lying inside the circumferential lines of a fitting element, which are limited on all sides by adjoining material of said fitting element, into slits in the area of their peaks and around the cutting or punching edge. This slit can also be made in the shape of a star.

For the manufacture of the fitting element developed according to the invention, another development will be advantageous in which the hump-like projections are at least approximately matched in the form of sections of a jacket of a circular cone.

It will be advantageous for the fitting elements produced by deep drawing and which are shaped approximately as a cup or a pot if the hump-like projections are reshaped into a rib-shaped calender cut. This reshaping can be accomplished during the deep drawing of the fitting element.

With the above, and other objects in view that will hereinafter appear, the nature of the invention will be more clearly understood by reference to the following detailed description, the appended claims and the several views illustrated in the accompanying drawings.

Figure 1:
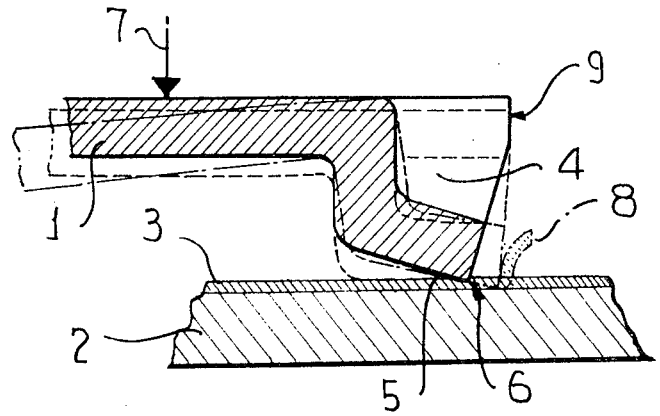
FIG. 1 is an enlarged fragmentary sectional view through a fitting element and the wall of the body of the container.

In FIG. 1 there is illustrated a fitting element 1 which is to be attached to a support, namely the body of a container or bucket, by means of projection welding. The fitting element 1, just like the body 2 of the container, has been reproduced only in a partial sectional view. The scales have been greatly enlarged in order to make clear the process developed according to the invention.

The body 2 of the container has a protective layer of varnish 3, which consists of an organic lacquer which is electrically nonconductive. Generally, the fitting element 1 has also been provided with such a layer of varnish. This protective layer 3 of varnish prevents an electrically conductive metallic contact between the fitting element 1 and the body 2 of the container, which is required in order to carry out the projection welding.

In order to produce this metallic contact, a hump-like projection 4 of the fitting element 1, which is indispensable to carry out the projection welding process, has been developed not in the customary manner like a knob or a pan but with a cutting or punching edge 6 running through the area 5 of the peak. As a result of this development, at least the hump-like projection 4 can be deformed in a limited way. This deformation occurs if a pressure is applied in the direction of an arrow 7 in FIG. 1 to press the fitting element 1 against the body 2 of the container in order to carry out the projection welding process.

In FIG. 1, it has been shown in an exaggerated manner in broken lines how the fitting element 1 is deformed whenever the force acts in the direction of arrow 7. One can recognize that in the case of this deformation only the hump-like projection 4 alone is deformed. In the area 5 of the peak, the cutting or punching edge 6 has at the same time a certain relative movement in relation to the body 2 of the container. In the course of this movement, the cutting or punching edge 6 digs through the protective layer 3 of varnish as a result of which the edge 6, as indicated in FIG. 1, removes a shaving 8, by localized cutting. In the course of this relative movement the cutting or punching edge 6 finally enters into a direct metallic contact with the body 2 of the container in the peak area of the hump-like projection 4 so that an electrically conductive connection is created between the fitting element 1 and the body 2 of the container via the hump-like projection 4, which electrical connection is not impeded by any kind of electrical resistances, such as remnants of varnish, films of oxide, etc.

The welding current, which for the purpose of carrying out the projection welding process, is conducted through the fitting element 1 to the body 2 of the container, therefore is utilized unimpededly and fully for the welding work and, in the area of the cutting or punching edge 6 in the peak area 5 of the hump-like projection 4, there develops a welding place which also is free of foreign influences as a result of remnant of varnish, etc. The welding connection will be accomplished with a lower than normal expenditure of welding current and has great strength. In consequence of the low current, the heating remains locally insignificant and the so-called heat points which are unavoidable in the case of the projection welding process and which show up on the inside of the wall 2 of the body of the container will remain very small.

Whenever the fitting element 1 is acted upon by pressure in the direction of arrow 7, not only a deformation will occur in the manner shown in FIG. 1 by the broken line, but a deformation also is possible which takes place in the manner shown in FIG. 1 by dash-dot lines. In the case of this deformation too, the relative movement of the cutting or punching edge 6, which has already been mentioned, in relation to wall of the body 2 of the container also occurs and through a cutting removal of the protective layer 3 of varnish a metallic contact between fitting element 8 and body 2 of the container is established.

In practice and generally speaking, neither a deformation of the fitting element 1 which is limited exclusively to the hump-like projection 4 (broken lines) nor one which is limited exclusively to the area lying outside the hump-like projection 4 (dash-dot lines) will separately occur, but a combined deformation will take place. Since both kinds of deformation lead to the relative movement of the cutting or punching edge 6 with respect to the body 2 and effectuate the establishment of a metallic contact, a perfect execution of the projection welding process will be guaranteed. The only prerequisite is that the cutting or punching edge 6 be inclined at an acute angle to the perpendicular onto the surface of the body 2 of the container in the case of a nondeformed fitting element 1, so that in the case of the relative movement a penetration of the layer 3 of varnish will take place. Such a penetration is impossible whenever the cutting or punching edge 6 coincides with the perpendicular line on the surface of body 2 of the container or even more so if it forms a convex angle with the surface of the fitting element 1.

Figure 2:
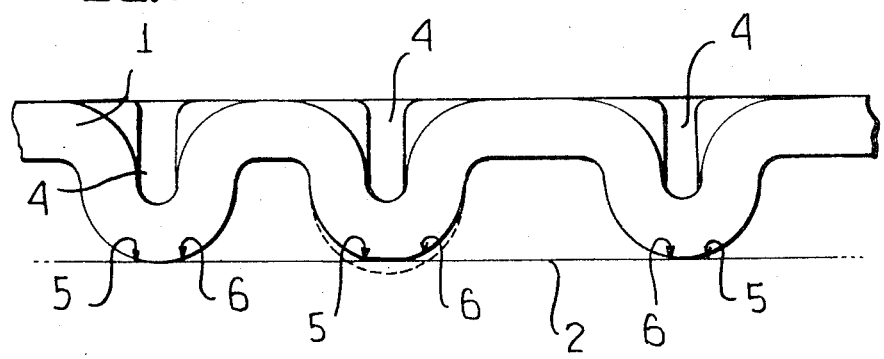
FIG. 2 is a partial side view on an enlarged scale of the outside edge of the fitting element developed in accordance with the invention.

FIG. 2 is a side view of a fitting element 1 developed according to the invention. In the case of this fitting element, three hump-like projections 4, one beside the other, have been provided. It is to be noted that the two outside ones are of the same size while the middle projection is higher than the two outside ones. Upon pressing fitting element 1 against the wall of the body 2 of the container, the middle hump-like projection 4 has a yielding resilient behavior and will yield until the two outside hump-like projections with the peak area 5 of their punching or cutting edge 6 will be in contact with the wall of the body 2 of the container and after deformation will also be in a metallic contact. The starting shape which the middle projection 4 has prior to its deformation is shown in FIG. 2 with broken lines. Exploitation of this yielding behavior or of the resilient characteristics of the hump-like projections which have a cutting or punching edge 4 running through the peak area 5 leads to considerable savings because greater finishing tolerances are admissible.

Figure 3:
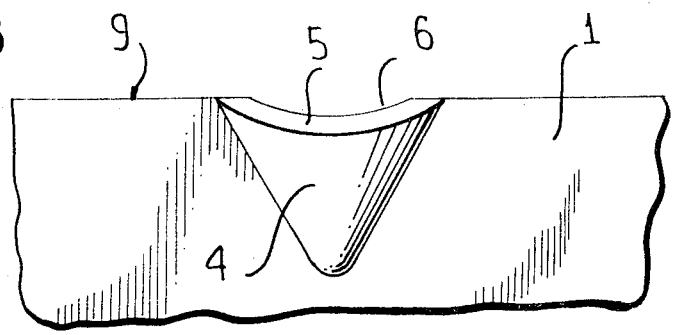
FIG. 3 is an enlarged partial bottom side view of a fitting element developed in accordance with the invention.

An embodiment by way of example for a preferred form of a hump-like projection 4 is shown in FIG. 3. In the case of this development, the hump-like projection 4 has the shape of a section of a circular envelope of a cone. In the example shown, the angle of the cone is in the range of 60°.

Figure 4:
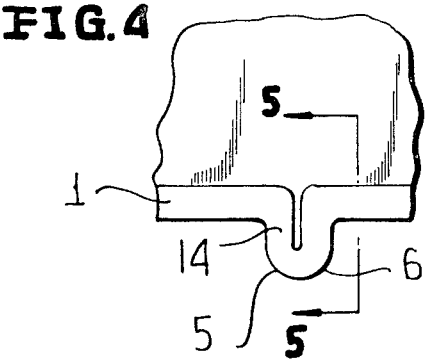
FIGS. 4 and 5 are fragmentary side elevational and sectional views of a further possible development of the hump-like projection in the case of the fitting element developed according to the invention, FIG. 5 being taken along the line 5—5 of FIG. 4.
Figure 5:
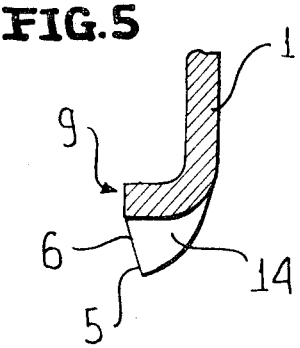

Another possible shape of a hump-like projection 14 is shown in FIGS. 4 and 5. In the case of this development, the hump-like projection 14 has been reshaped so that it forms a flattened channel. The hump-like projections 4 and 14, shown in FIGS. 1 to 5, have as a common characteristic that they are disposed on an outside or limiting edge 9. The forms of development of the hump-like projection shown in FIGS. 4 and 5 will develop especially whenever the limiting edge 9 represents the circumferential edge of a pot-like body formed for example by deep drawing, etc. In the case of all these embodiments it is recommended that one take care that the hump-like projections 4 and 14 be arranged on the fitting element 1 symmetrically either with regard to a reference line or to a reference point.

Figure 6:
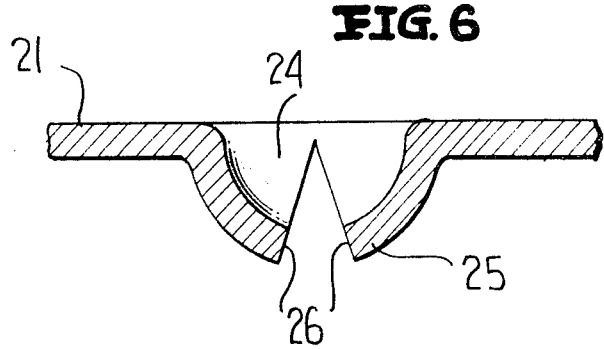
FIG. 6 is an enlarged sectional view of a further possible development of the hump-like projection of the fitting element developed according to the invention.

In the case of the embodiment shown by way of example in FIG. 6, the fitting element 21 has a hump-like projection 24 which at first glance appears to deviate little in its basic form from the hump-like projections which had been used hitherto for carrying out the projection welding process. The essential difference however consists in this, that the hump-like projection 24 according to FIG. 6 has a cutting or punching edge 26 in its peak area 25 just like the other hump-like projections according to the examples in FIGS. 1 to 5. This cutting or punching edge 26 however was created in the case of the example according to FIG. 6 by slitting a pan or pot-like projection 24. This slitting possibly can also be developed in the shape of a star.

Figure 7:
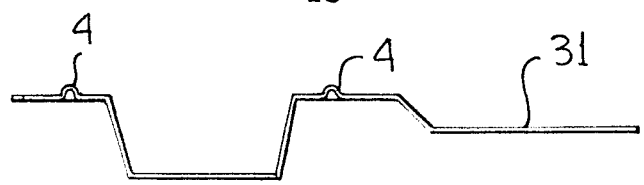
FIGS. 7 and 8 are side and plan views of a fitting element which is used in the container industry.
Figure 8:
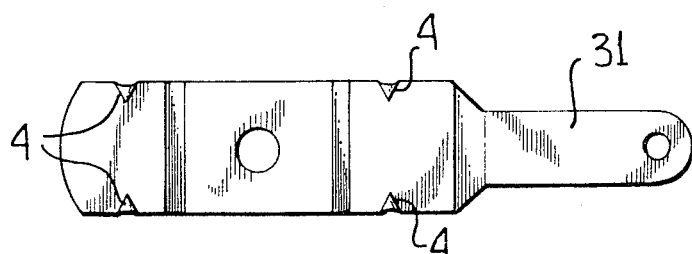
Figure 9:
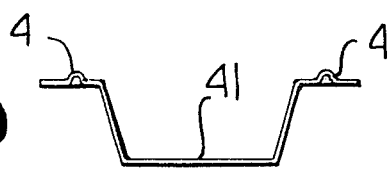
FIGS. 9 and 10 are side and plan views of another conventional type of container fitting.
Figure 10:
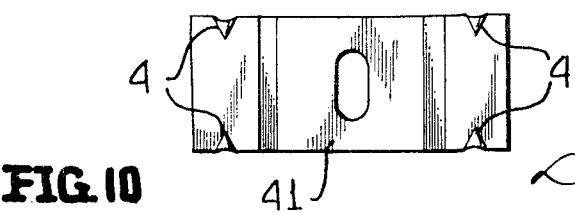

Examples for the practical form of fitting elements are shown in FIGS. 7-11. The fitting element 31 according to FIGS. 7 and 8 represents the eye of a bucket with a tip-stretched bridge guide. The fitting element 41 according to FIGS. 9 and 10 shows a bridge guide or a bucket eye.

Figure 11:
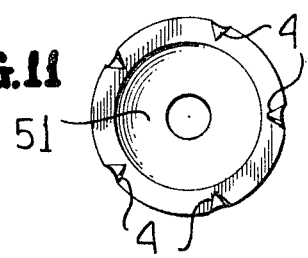
FIG. 11 is a plan view of a further container fitting.

The embodiment shown in FIG. 11 is a fitting element 51 in the form of a pot or pan-shaped bridge guide or bucket eye.

Although only preferred embodiments of the specific fitting elements have been specifically illustrated and described herein, it is to be understood that minor variations may be made in the construction of the hump-like projections on the fitting elements without departing from the spirit and scope of the invention, as defined by the appended claims.

What is claimed as new:

1. In a process of resistance welding together two metal parts of which at least one part has a surface coating of electrically nonconductive material, the steps of providing on the other part at least one hump-like projection having a projecting free terminal cutting edge, relatively positioning the parts with the cutting edge engaging the one part, and forcing the parts together and deforming the hump-like projection with the cutting edge moving both axially and laterally relative to the other part and cutting through the surface coating into metal-to-metal contact with the one part, effecting a scraping away of a portion of the surface coating and increasing the surface contact between the projection and metal of the one part.

2. A sheet metal fitting particularly adapted to be resistance welded to a metal member having a coating of electrically nonconductive material, said fitting having at least one hump-like projection means for welding attachment to a metal member, said projection means having a free terminal cutting edge for engagement with a member to which said fitting is to be welded and said projection means being readily deformable under pressure to effect movement of said cutting edge both axially and laterally relative to said fitting whereby during a pressure welding operation said cutting edge will initially move and cut through a coating layer and establish metal-to-metal contact.

3. The fitting of claim 2 wherein said cutting edge is disposed along a terminal edge of said fitting.

4. The fitting of claim 2 wherein said hump-like projection means has a configuration of a segment of a circular envelope of a cone.

5. The fitting of claim 2 wherein said projection means has an apex, said hump-like projection means being slit generally along said apex to define said cutting edge.

* * * * *